United States Patent [19]

Falciani et al.

[11] Patent Number: 4,700,838

[45] Date of Patent: Oct. 20, 1987

[54] COMPOSITE CONTAINER FOR STERILE SOLID PRODUCTS

[75] Inventors: Marco Falciani, Milan; Roberto Bonamigo, Usmate Di Velate, both of Italy

[73] Assignee: Antibiotici Cristallizzati Sterili s.r.l., Milan, Italy

[21] Appl. No.: 860,994

[22] Filed: May 8, 1986

[30] Foreign Application Priority Data

May 13, 1985 [IT] Italy ............................. 20672A /85

[51] Int. Cl.$^4$ ...................... B65D 75/26; B65D 81/18
[52] U.S. Cl. ................................... 206/438; 206/484; 206/524.2; 383/37; 383/116; 428/35; 604/410
[58] Field of Search ..................... 206/438, 484, 524.2, 206/524.9, 527, 528; 383/109, 111, 116, 37; 428/35; 604/410

[56] References Cited

U.S. PATENT DOCUMENTS

| | | | |
|---|---|---|---|
| 2,281,473 | 4/1942 | Brewer | 206/438 |
| 3,248,040 | 4/1966 | Friedman | 383/116 |
| 3,967,728 | 7/1976 | Gordon et al. | 206/438 |
| 4,085,244 | 4/1978 | Stillman | 383/116 |
| 4,258,848 | 3/1981 | Akao et al. | 383/116 |
| 4,322,465 | 3/1982 | Webster | 206/484 |
| 4,384,646 | 5/1983 | Sakamoto et al. | 206/315.9 |
| 4,387,126 | 6/1983 | Rebholz | 428/35 |

FOREIGN PATENT DOCUMENTS 2550768 2/1985 France ............................. 383/116

*Primary Examiner*—Jimmy G. Foster
*Attorney, Agent, or Firm*—Oblon, Fisher, Spivak, McClelland, & Maier

[57] ABSTRACT

The present invention relates to a composite container suitable for the lasting preservation, under absolutely sterile conditions, of sterile, solid products, particularly pharmaceutical products.

Such a container comprises an inner bag, or tubular element, made of low-density polyethylene and directly containing the product to be preserved and an outer bag consisting of three layers of different materials, of which polyethylene, the high-density type being preferred, or polyvinylchloride forms the innermost layer, aluminium the intermediate layer and a polyester resin the outermost one: the ends of the bags are hermetically sealed.

5 Claims, 1 Drawing Figure

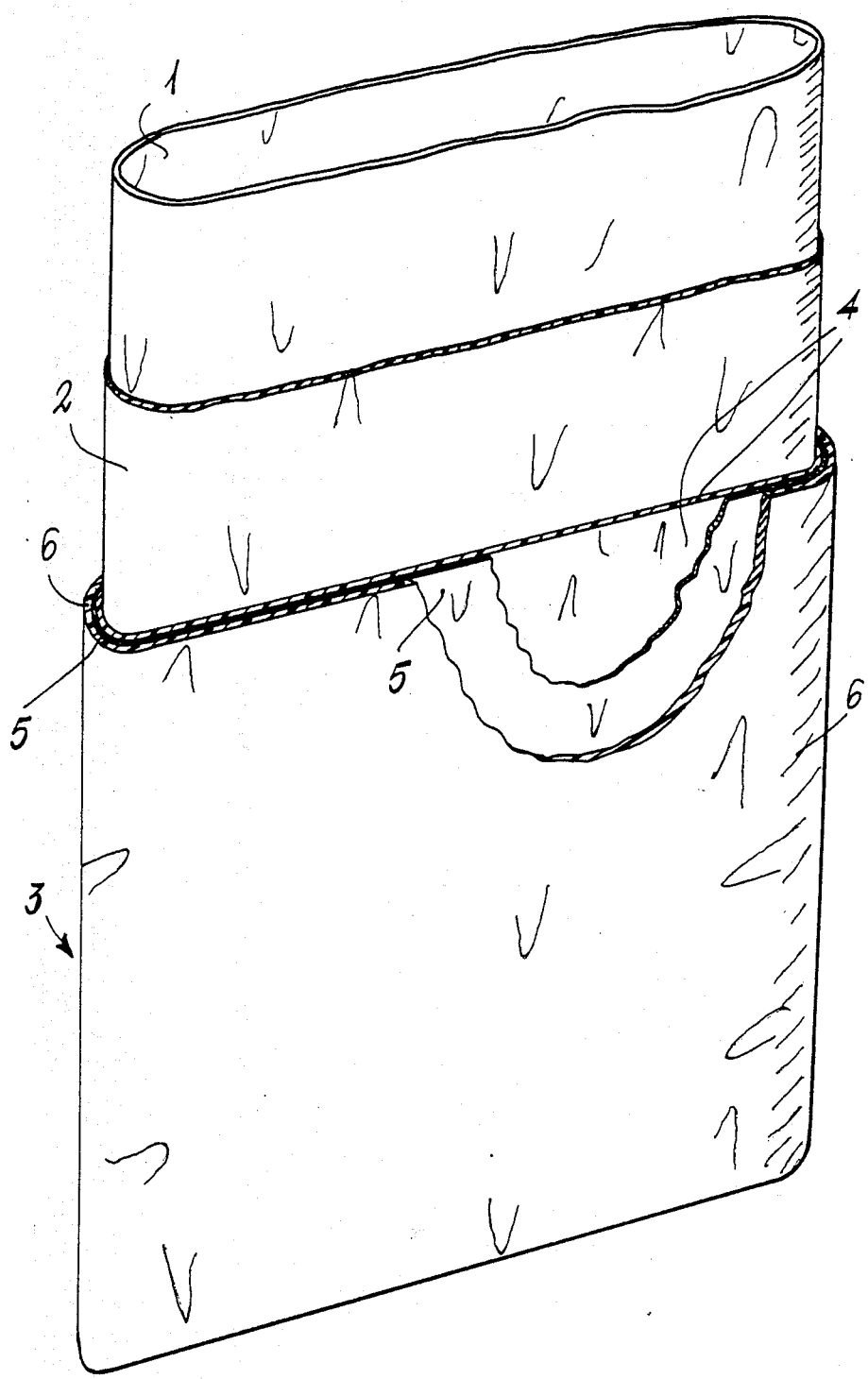

COMPOSITE CONTAINER FOR STERILE SOLID PRODUCTS

DESCRIPTION

The present invention relates to a composite container for sterile, solid products.

Many solid products, particularly pharmaceutical products in bulk, are known which require to be contained, stored and, if that is the case, carried in containers securing their thorough preservation under sterile and incontaminate conditions.

Pharmaceutical products in bulk are presently stored and carried, under sterile conditions, in rigid metal containers with openings hermetically sealed by rubber caps or like, the caps being fastened at the mouth of said openings by a metal ring which is in its turn covered by a protective tape. This type of packing exhibits a number of drawbacks resulting from the high cost of metal containers, the weight which heavily affects the transport expenses, the need of recovering the containers for reutilization purposes, which also involves complex and accurate records of their movements, the need to provide for the thorough cleaning and sterilization of the containers before their reutilization and finally the damages frequently occuring, during transport or utilization, due to the rigidity of metal containers.

The main object of the present invention is to provide "disposable" containers characterized by low cost, light weight, high impact strength for transport or utilization and perfect preservation of the contained products, under (monitored) sterile conditions.

A further object is to provide containers of the above-mentioned type which can be partially opened to allow visual inspection of the contained products, while preserving the sterile conditions thereof.

These and still further objects are achieved by a composite container comprising at least two separate bags, one inside the other with the inner bag directly containing the sterile solid product, having their respective ends hermetically sealed, wherein the inner bag is made of low-density polyethylene and the outer bag consists of three layers of different materials, polyethylene or polyvinylchloride forming an innermost layer, aluminium an intermediate layer and a polyester resin an outermost one.

For a better understanding of structure and characteristics of the composite container according to the present invention, a preferred embodiment thereof will be hereinafter illustrated, by way of a non-limitative example, with reference to the accompanying drawing, the only FIGURE of which shows a prospective, partially sectional view of a container according to the invention, with components in part broken away and the different bags in open position and emerging one from the other.

The FIGURE clearly shows that the composite container comprises an inner bag 1 made of low-density polyethylene, an intermediate bag 2 made of high-density polyethylene and an outer bag 3 consisting of three layers of different materials, high-density polyethylene or polyvinylchloride forming the innermost layer 4, a thin aluminium foil the intermediate layer 5 and a polyester resin the outermost layer 6.

In the FIGURE the three bags 1,2 and 3 are represented in the open condition, with the top portions of bag 2 and 3 broken away for allowing the sight of the underlying bag; the utilization of the composite container involves the introduction of the sterile, pharmaceutical product in bulk in bag 1 and the sealing of its free end; afterwards the free end of bag 2 is sealed, which thus entirely contains and protects bag 1, and finally the opening of bag 3 is sealed so as to protect bags 1 and 2.

The various bags can be obtained by continuous, tubular elements which are cut and then sealed at their ends; obviously, all the inner surfaces of the three bags and the outer surface of at least bag 1 will be sterile. Introduction and packing of the pharmaceutical product in bulk are carried out in sterile environment and conditions. After the introduction of the pharmaceutical, solid product in bulk in bag 1 and before sealing its free opening, the bag is evacuated by means of any, known, suitable, vacuum device; if that is the case, nitrogen is afterwards introduced in the evacuated bag.

More particularly, all the operations involving the handling of the pharmaceutical product are carried out in a hood under sterile, laminar flow.

In order to explain further the manufacture method of the composite container, a practical embodiment thereof will be hereinafter described.

The inner bag 1 is made of low-density polyethylene, the type without additives suitable for containing drugs for parenteral or ophthalmic use being preferred; the polyethylene film is 10/100 mm thick and the bag is 450 mm wide and 500 mm high. The bag manufactured according to this standard meets the requirements of U.S.P. XXI for sterile liquids and the regulations of European Pharmacopoeia Ph. Eur. 1983. Such a bag exhibits two importants characteristics:

i.e. (a) the transparency which allows the visual examination of the contained product. This is important because, if desired, the composite container can be partially opened by tearing and opening the outer 3 and intermediate 2 bags, without affecting the bag 1. The pharmaceutical product can thus undergo visual examination, while remaining isolated from the external environment and retaining its sterile characteristics; (b) the pharmaceutical product in bag 1, optionally, can be treated with ethylene oxide or $\gamma$-rays, in order to secure sterile conditions.

The intermediate bag 2 is made of a 15/100 mm thick, high-density polyethylene film, the type suitable for containing drugs for parenteral and ophthalmic use being preferred: the bag is 470 mm wide and 550 mm high. It, too, meets the regulations of U.S.P. XXI and European Pharmacopoeia Ph. Eur. 1983. Bag 2 is opaque, moisture impermeable and exhibits higher mechanical strength than inner bag 1. The outer bag 3 is 500 mm wide, 600 mm high and is made of a composite sheet consisting of a 7,5/100 mm thick, high-density polyethylene layer 4, a 1/100 mm thick, aluminium intermediate foil 5 and a 1,2/100 mm thick, polyester resin outer layer 6. The composite sheet of bag 3 exhibits very low moisture-vapor transmission (0,01 to 0,03 $g/m^2$ in 24 hours), absolute opacity, longitudinal tensile strength of 23,4 kg, transverse tensile strength of 27,7 kg, internal perforation strength of 7,6 kg and external perforation strength of 6,9 kg.

The sealing band at the mouth of every box is 8 mm wide.

It can be appreciate that the filling operation of bag 1 with the pharmaceutical product is carried out in a hood under sterile, laminar flow (as mentioned above); afterwards the bag is evacuated and the mouth is sealed:

both the inner and outer surfaces of bag 1 will thus result sterile and contamination free. The filled and sealed bag 1 is then introduced in bag 2, which is, in its turn, evacuated, sealed and then introduced and shut, with sealing, in the bag 3 which secures lasting sterile conditions also in the outer surface of bag 2 (besides, obviously, bag 1).

In the above-mentioned embodiment a composite container has been described, consisting of three separate bags 1,2,3. However preferred is this type of packing, satisfactory results can indeed be obtained even with only two bags, the inner one corresponding to the described bag 1 and the outer one to the multi-layer bag 3.

In any case, the composite packing obtained as described has the additional advantages of the low cost, low volume and very light weight. A number of composite bags, such as described, can thus be contained in a case, such as in polystyrene, and this, in its turn, in a corrugated card-board box, whereby a maximum transportation reliability can be achieved. It will be finally appreciated that writings and labels carrying all appropriate information and warnings for the packed product can be applied directly to every bag.

We claim:

1. Composite container for sterile, solid products, characterized in that it comprises at least two separate bags, one inside the other with the inner bag directly containing the sterile solid product, having their respective ends hermetically sealed, wherein the inner bag is made of low-density polyethylene and the outer bag consists of three layers of different materials, polyethylene or polyvinylchloride forming an innermost layer, aluminium an intermediate layer and a polyester resin an outermost layer.

2. Composite container as claimed in claim 1, characterized in that it comprises an intermediate bag, made of high density polyethylene, interposed between said inner and outer bags.

3. Composite container as claimed in claims 1 or 2, wherein said polyethylene used in said bags is compatible with parenetral and ophthalmic use.

4. Container as claimed in claims 1 or 2, wherein said polyethylene forming the innermost layer of outer bag is the high-density type.

5. Composite container as claimed in claim 2, characterized in that the inner bag is made of a 10/100 mm thick film, the intermediate bag of a 15/100 mm thick film and the outer bag consists of an innermost layer, an intermediate layer and an outermost layer, their thicknesses being about 7,5/100 mm, 1/100 mm and 1,2/100 mm, respectively.

* * * * *